(12) United States Patent
Broughman

(10) Patent No.: US 8,276,610 B2
(45) Date of Patent: Oct. 2, 2012

(54) TOILET CISTERN INLET VALVE

(75) Inventor: Peter Henry Broughman, Tumby Bay (AU)

(73) Assignee: Super Star Toilet System Pty Ltd of RSM of Bird Cameron, Port Lincoln (AU)

(*) Notice: Subject to any disclaimer, the term of this patent is extended or adjusted under 35 U.S.C. 154(b) by 474 days.

(21) Appl. No.: 12/593,165

(22) PCT Filed: Mar. 26, 2008

(86) PCT No.: PCT/AU2008/000413
§ 371 (c)(1), (2), (4) Date: Nov. 9, 2009

(87) PCT Pub. No.: WO2008/116256
PCT Pub. Date: Oct. 2, 2008

(65) Prior Publication Data
US 2010/0132812 A1    Jun. 3, 2010

(30) Foreign Application Priority Data
Mar. 27, 2007   (AU) ................................ 2007901584

(51) Int. Cl.
*F16K 31/18* (2006.01)
(52) U.S. Cl. ........ 137/414; 137/432; 137/437; 137/444; 137/451
(58) Field of Classification Search ................ 137/411, 137/414, 429, 430, 432, 434, 436, 437, 442, 137/444, 451
See application file for complete search history.

(56) References Cited

U.S. PATENT DOCUMENTS

| | | | | | |
|---|---|---|---|---|---|
| 2,619,122 | A | * | 11/1952 | Hunter | 251/120 |
| 3,194,258 | A | * | 7/1965 | Grant | 137/414 |
| 3,729,017 | A | * | 4/1973 | Brandelli | 137/414 |
| 3,880,476 | A | * | 4/1975 | Belart et al. | 303/119.2 |
| 4,966,199 | A | * | 10/1990 | Ruschke | 137/843 |
| 5,067,516 | A | * | 11/1991 | Gale | 137/414 |
| 5,090,659 | A | * | 2/1992 | Bronnert | 251/61.1 |
| 5,232,194 | A | | 8/1993 | Saadi | |
| 5,335,694 | A | | 8/1994 | Whiteside | |
| 5,337,781 | A | * | 8/1994 | Johnson | 137/434 |
| 5,421,361 | A | * | 6/1995 | Johnson | 137/414 |
| 5,836,346 | A | | 11/1998 | Nichols-Roy | |
| 5,887,848 | A | | 3/1999 | Wilson | |
| 5,904,176 | A | * | 5/1999 | Li | 137/434 |
| 6,260,574 | B1 | * | 7/2001 | Nichols-Roy | 137/414 |
| 6,332,475 | B1 | * | 12/2001 | Brougham | 137/414 |
| 6,679,285 | B2 | * | 1/2004 | Pablo | 137/414 |
| 6,712,090 | B1 | | 3/2004 | Brandelli | |

* cited by examiner

*Primary Examiner* — John K Fristoe, Jr.
*Assistant Examiner* — Jessica Cahill
(74) *Attorney, Agent, or Firm* — Renner Kenner Greive Bobak Taylor & Weber

(57) ABSTRACT

A toilet cistern inlet valve, said inlet valve including an inlet stem connected to a water supply, a canister surrounding said inlet stem, a float canister freely supported on said canister, an annular float adjustably positioned on said float canister, an upper valve body, a pilot diaphragm valve, and a diaphragm filling valve within the upper body whereby during the emptying of the cistern the float canister lowers and contacts an actuator button to contact the pilot diaphragm valve to open the diaphragm filling valve to refill the toilet cistern.

5 Claims, 9 Drawing Sheets

TOILET CISTERN INLET VALVE

This invention relates to a toilet cistern inlet valve.

Inlet valves for toilet cistern inlet valves are controlled by a water level sensing device usually a float, and it is well known that a float is provided at the end of an arm pivoted to the valve housing, the other end of the arm pressing on a small plunger having a sealing washer pad to press against the valve seat.

Also cistern inlet valves are known having a float slideable on the valve column connected to the inlet to the cistern, there being a small lever arm connecting the float to a valve member to close on a valve seat at the upper end of the column.

In all toilet cistern inlet valves it is desirable that the valve permit the reasonably rapid filling of the cistern, but at the same time be quiet in operation so that the noise produced by the rapid filling of the cistern is minimal. However to rapidly fill the cistern, the valve must be open to an extent to permit a large flow of water. In areas where the water supply is provided at high pressure, the valve must close off at a reasonably rapid rate, but should not be at a rate to produce a rebound shock wave to proceed back through the water supply line, in other words to produce water hammer. Thus it is desirable that there should be a reasonably soft closing of the valve without any likelihood of water hammer, irrespective of the water supply pressure.

It is an object of this invention to provide an improved toilet cistern inlet valve which is quiet in operation.

A further object of the invention is to provide a toilet cistern inlet valve in which the valve closes with little or no noise and in a manner which prevents or minimises shock waves in the inlet water supply line.

Figure 1:
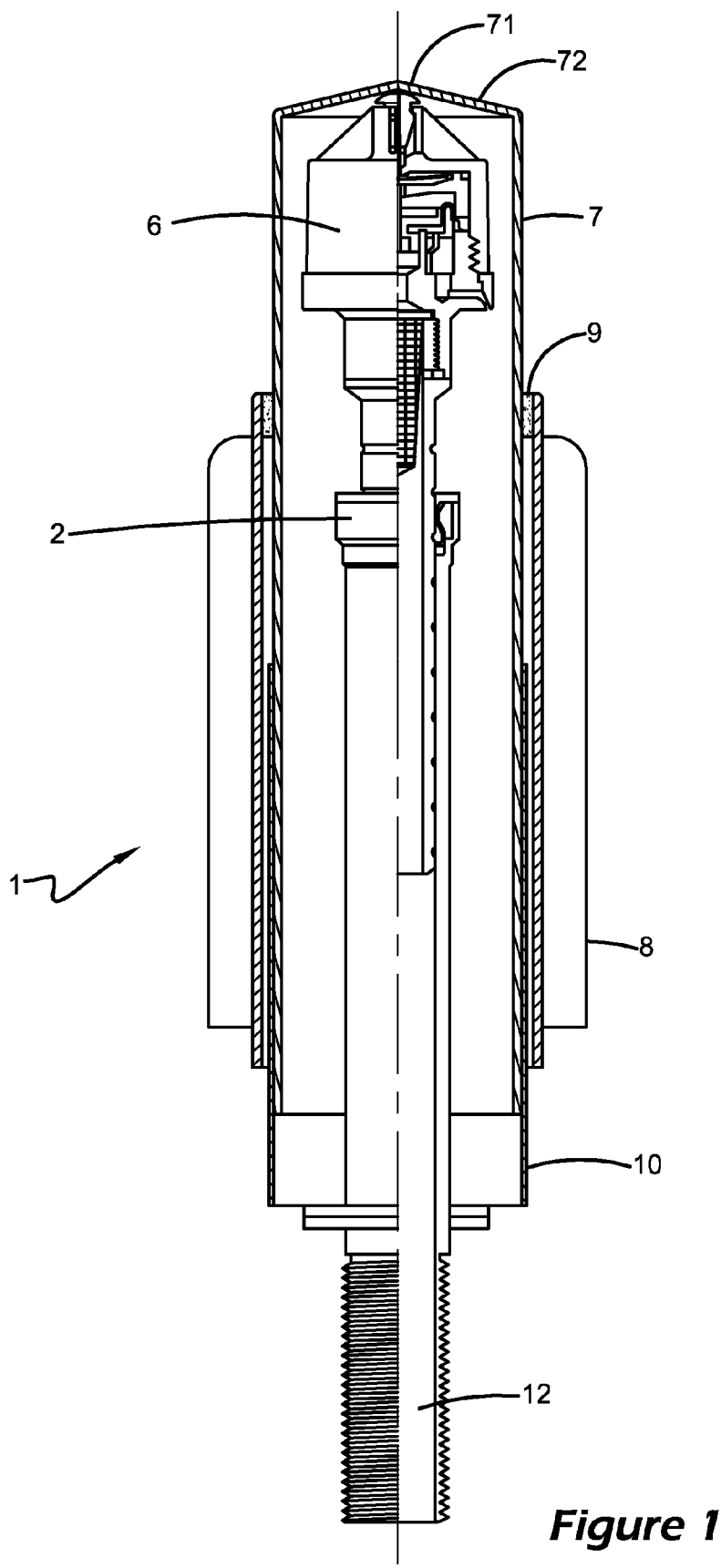
Figure 2:
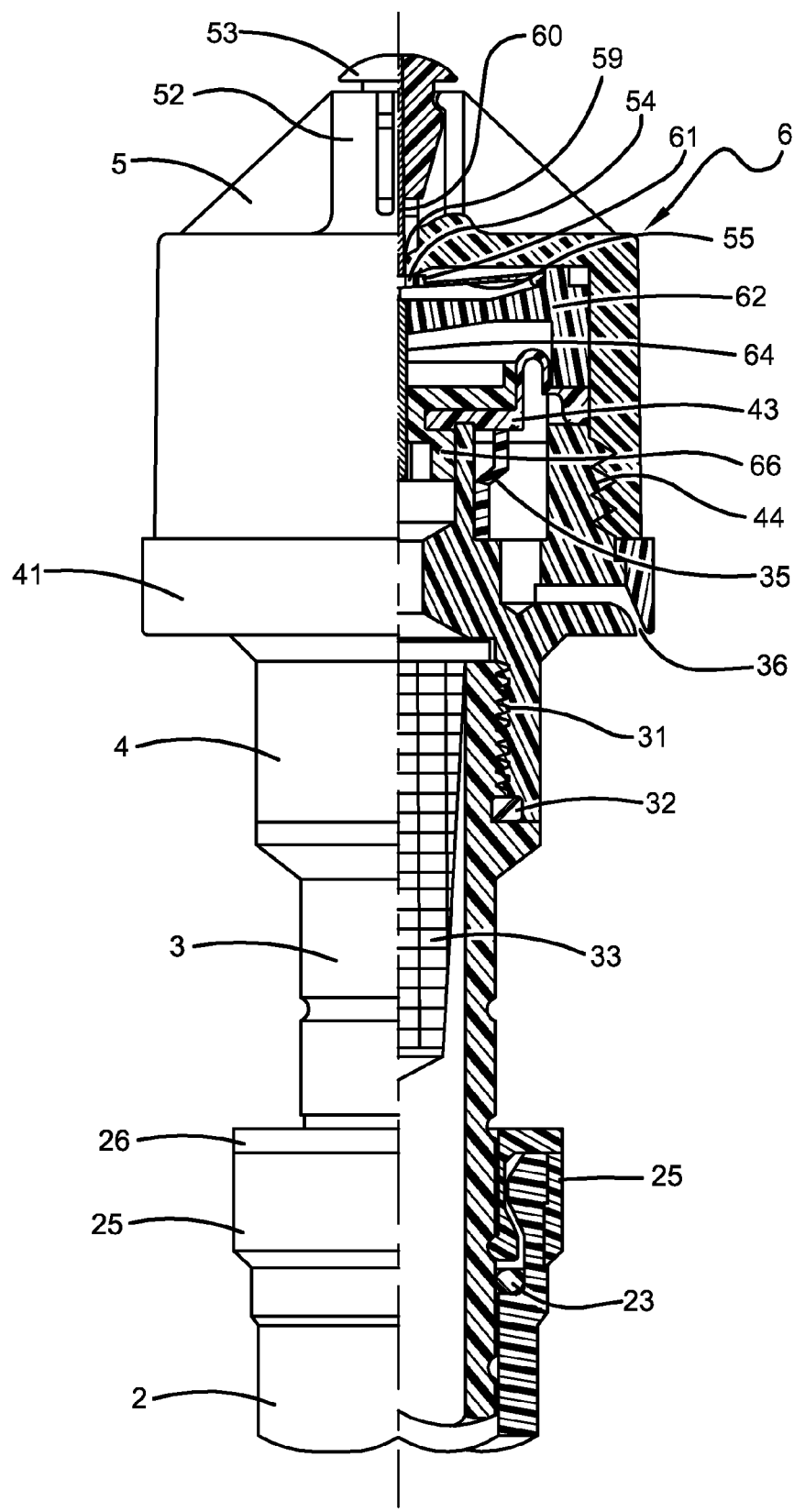
Figure 3:
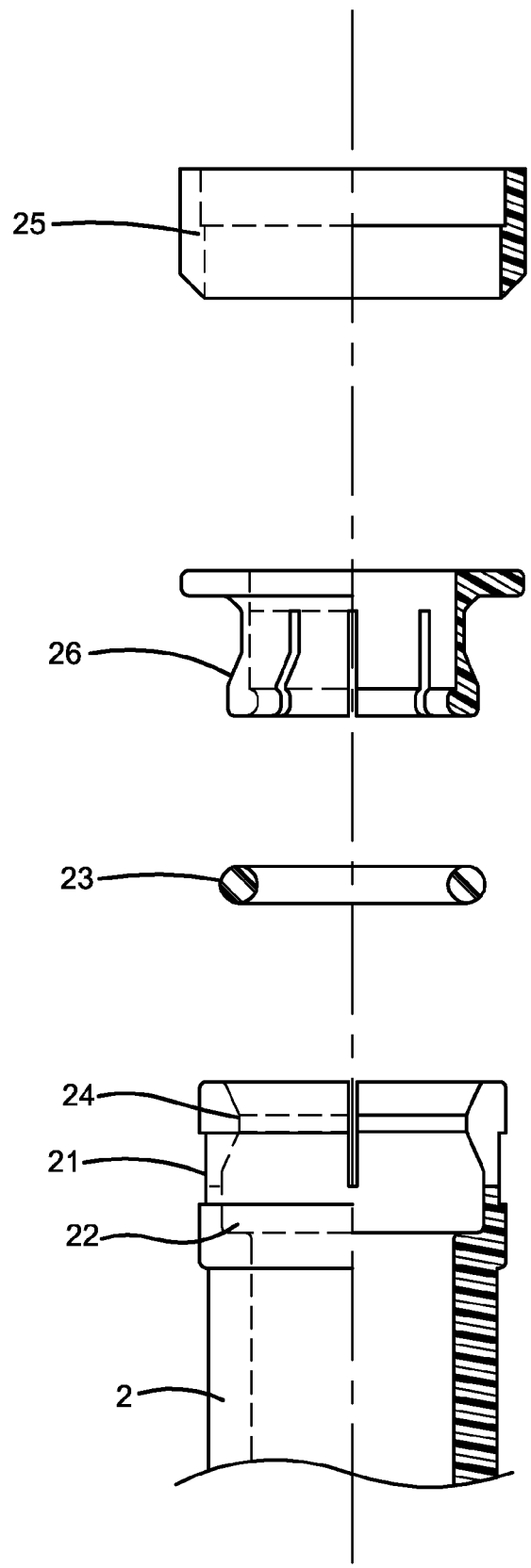
Figure 4:
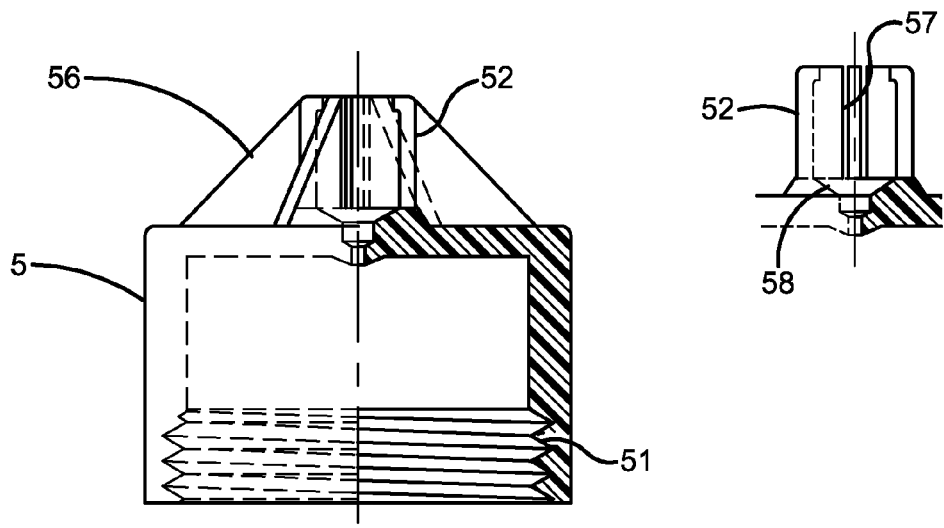
Figure 5:
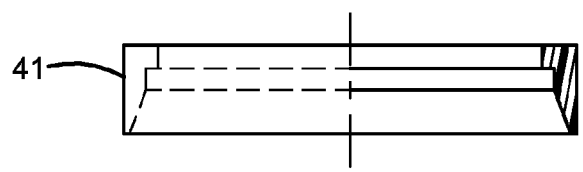
Figure 6:
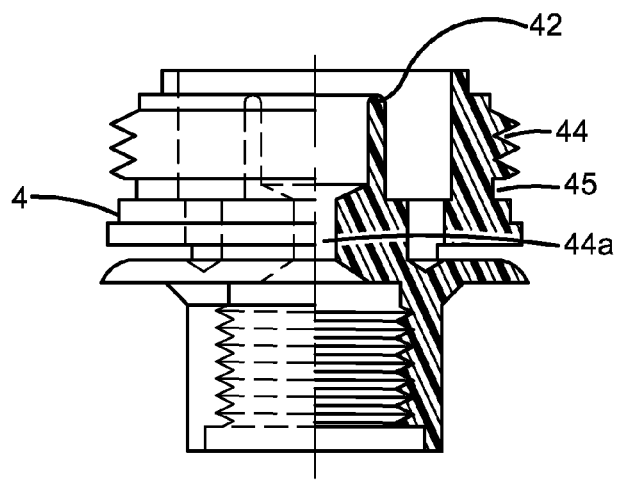
Figure 7:
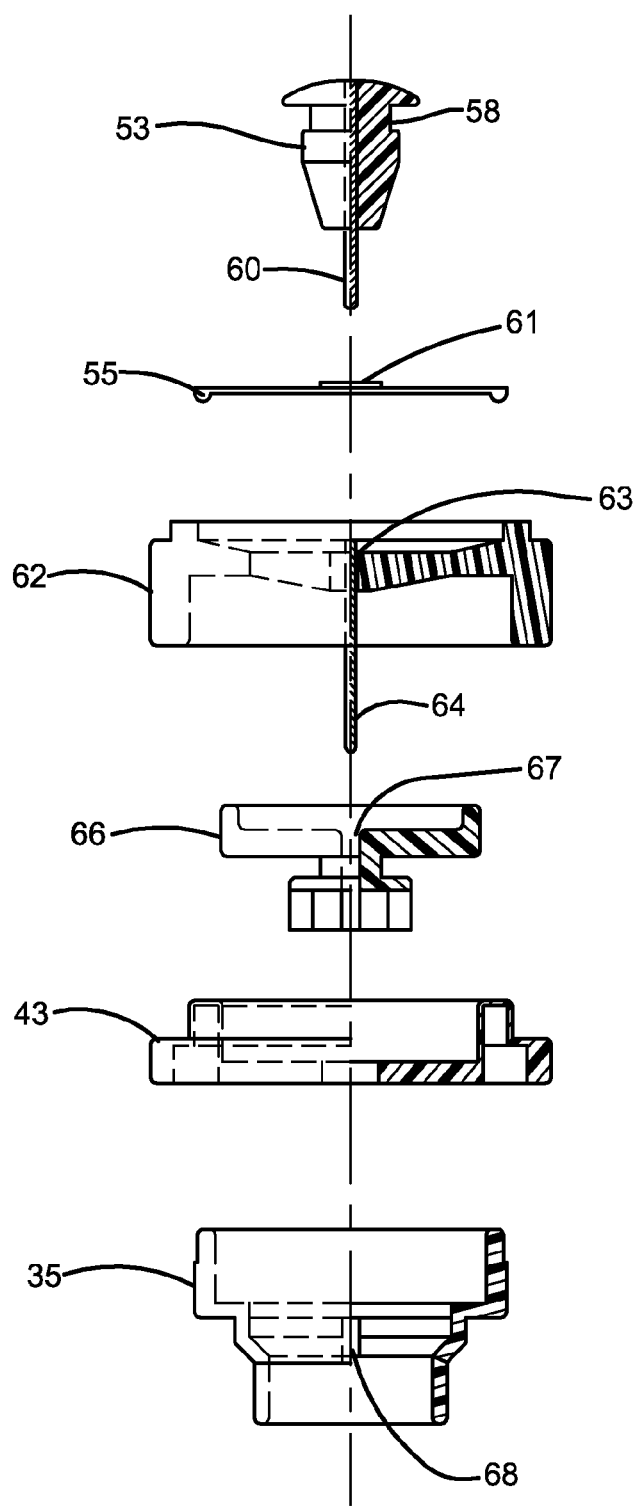
Figure 8:
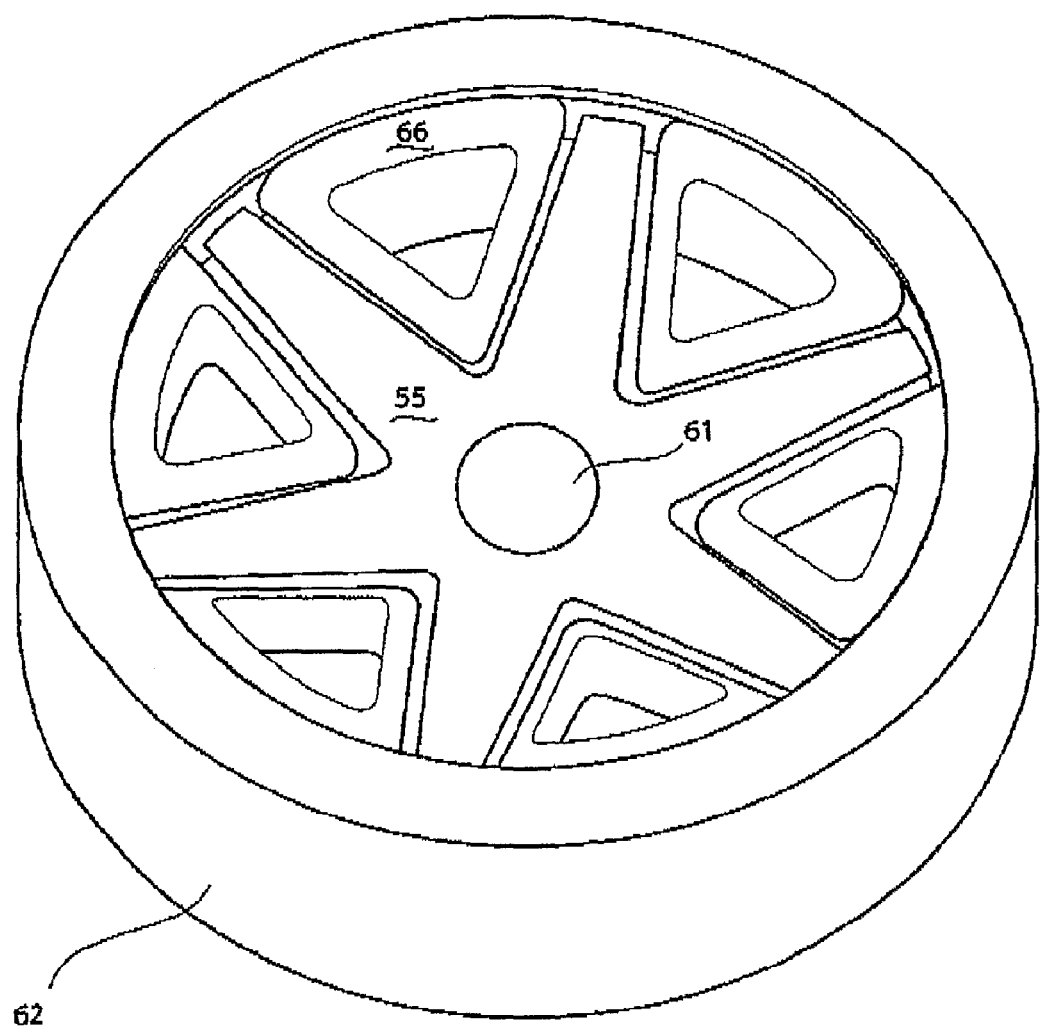
Figure 9:
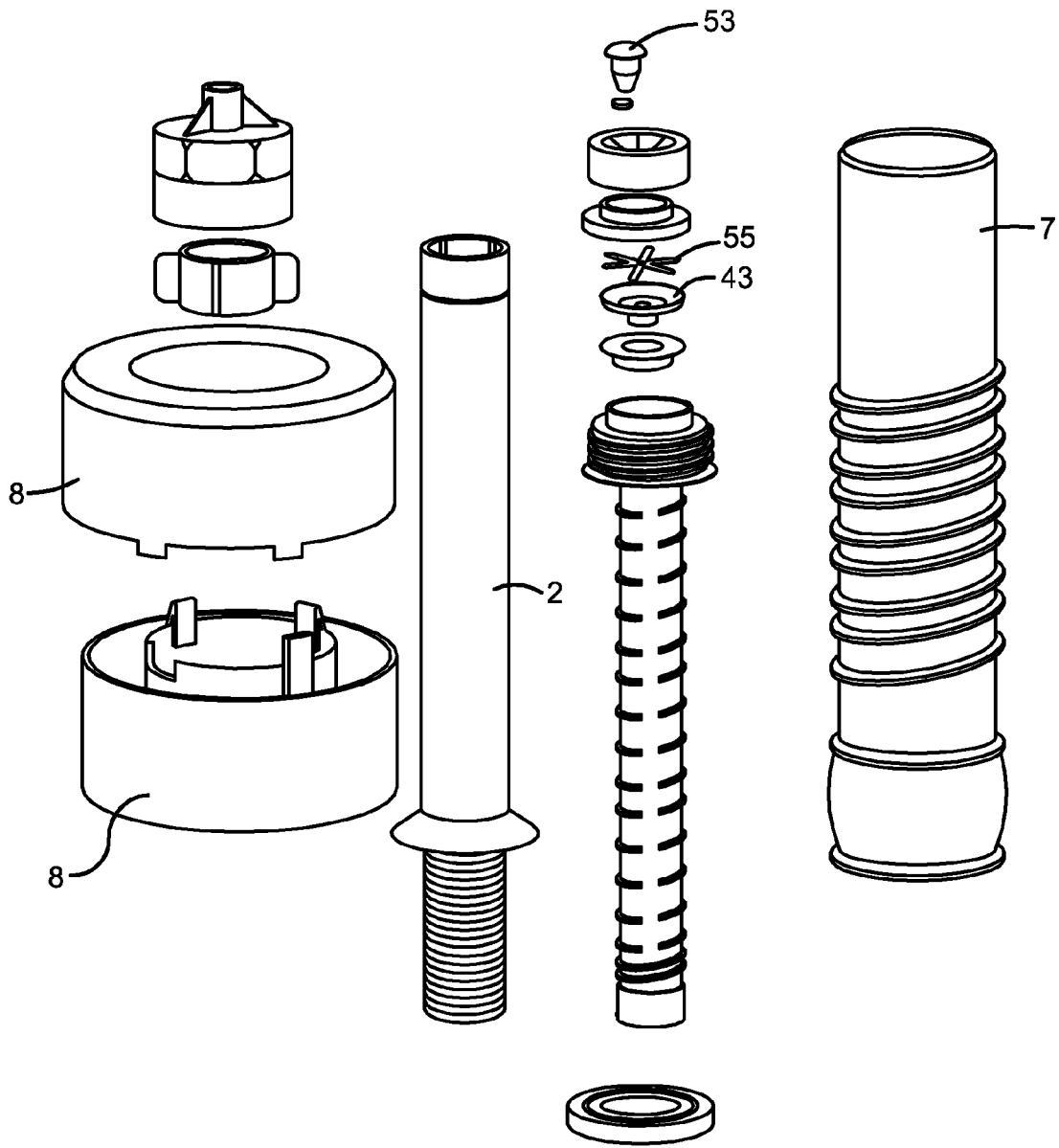
Figure 10:
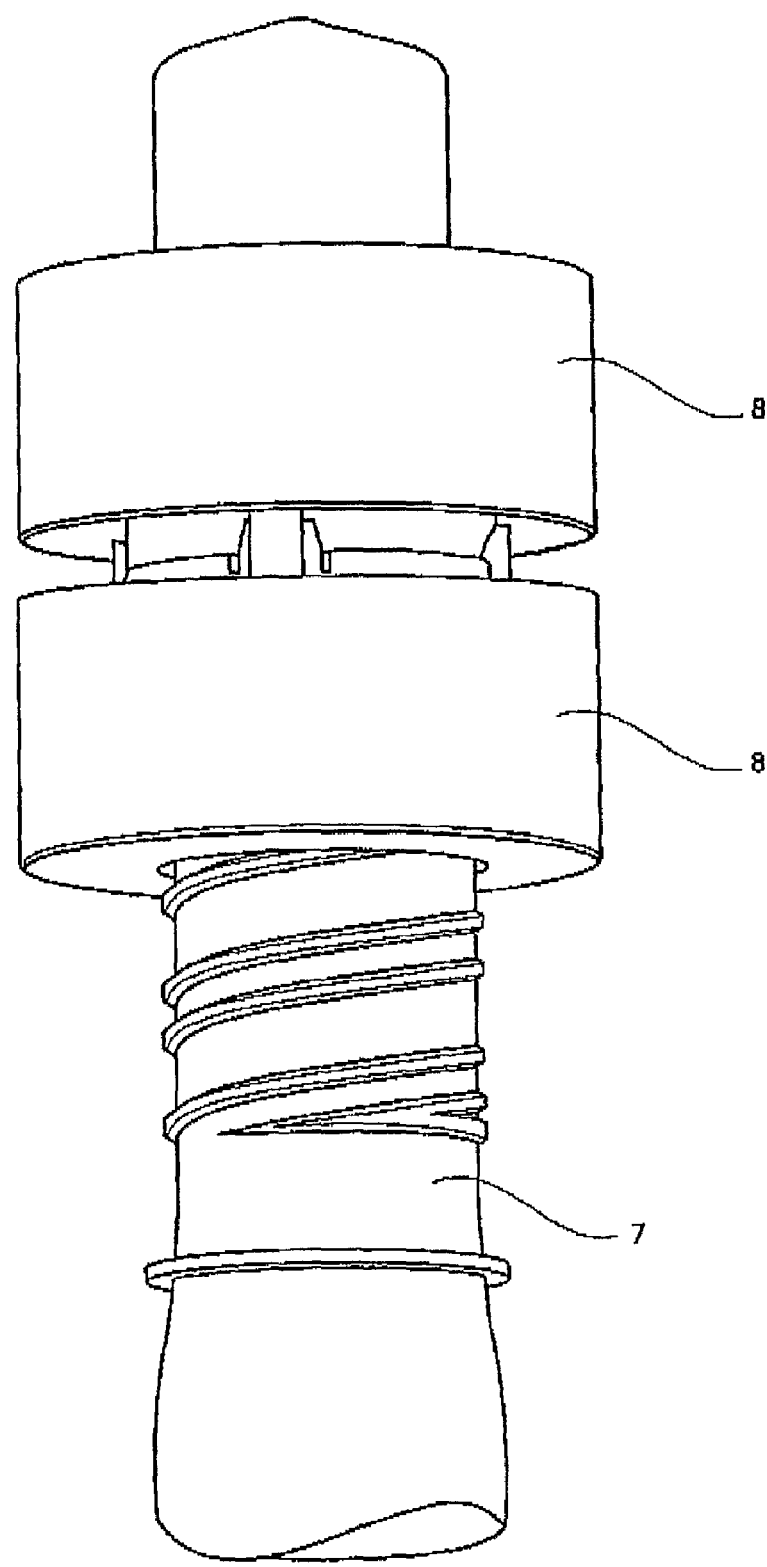
Figure 11:
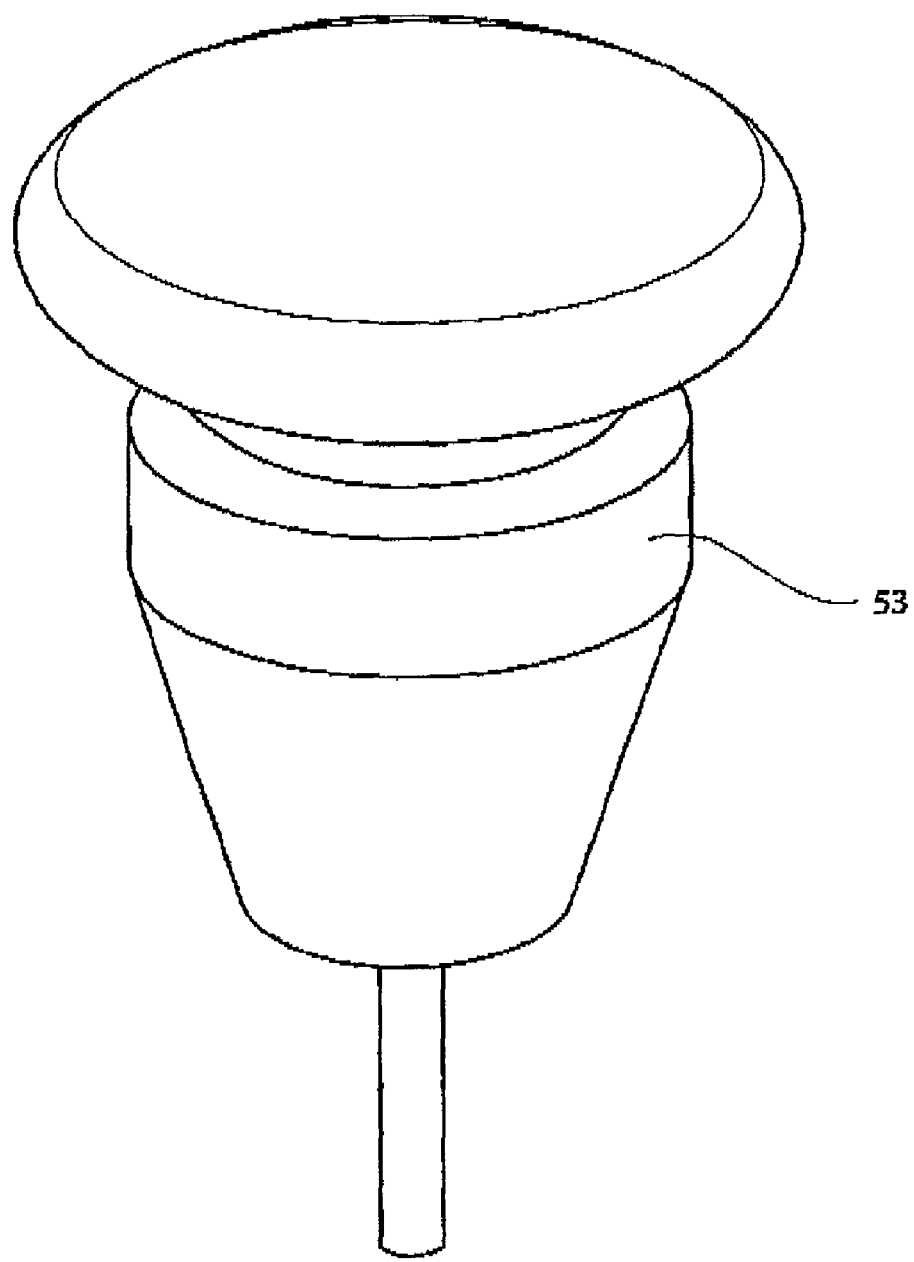

In order to describe the invention reference will now be made to the accompanying drawings in which FIG. 1 is a general arrangement view of a valve embodying the invention, FIG. 2 is a similar view of the upper portion of the valve, FIG. 3 is an exploded view of the locking of the lower stem to the upper stem on the body, FIG. 4 is a view of the upper valve body, FIG. 5 is a view of the deflector skirt, FIG. 6 is a view of the lower valve body, FIG. 7 is an exploded view of the operative parts of the reed valve and diaphragm valve, FIG. 8 is a further view of the controlling diaphragm valve and spacer, FIG. 9 is an exploded view of a further form the cistern inlet valve, FIG. 10 is a view of the float and adjustment, and FIG. 11 is a view the operating button.

BRIEF DESCRIPTION OF THE INVENTION

There is provided according to the invention an inlet valve for a toilet cistern, said inlet valve including an inlet stem connected to a water supply, a canister surrounding said inlet stem, a float canister freely supported on said canister, an annular float adjustably positioned on said float canister, a pilot diaphragm valve, a diaphragm filling valve whereby the float canister opens the pilot diaphragm valve to open the diaphragm filling valve on the float canister lowering during the emptying of the cistern.

Preferably the pilot diaphragm valve is a star valve.

DESCRIPTION OF THE PREFERRED EMBODIMENT

The valve 1 comprises a mounting lower stem 2, connected by a flange gasket 11 to a water supply inlet 12 which supports the valve, the mounting lower 2 stem being connected to an upper stem 3, lower valve body 4 and upper valve body 5 housing the control valve assembly 6. Surrounding the valve above the mounting lower stem 2 there is provided a freely supported float canister 7 carrying on its outside an annular float element 8 having friction pads 9 to engage the canister 7 whereby the annular float element 8 may be adjustably positioned along the canister 7. The canister 7 has a canister extension 10 slideable on the canister 7, the annular area between the canister extension and the stem providing the water outlet. The canister extension provides that the valve discharge may be carried to the base of the tank in which the valve is installed.

The mounting lower stem 2 has at its upper end 21 forming a housing for the adjustable stem locking device, the upper stem 3 being slideably received in the lower stem for adjustment purposes. The housing incorporates a shoulder 22 to locate a pressure sealing O-ring 23, and internal ramped surface 24 to provide a wedging action and an external rebate to locate a retaining collar 25.

The locking collet 26 has external profiles matched to the upper end housing 21 of the mounting lower stem 2 such that vertical movement of the locking collet 26 provides a wedging action resulting in a collapse of its internal diameter. The internal profile provides a lip, the shape of which is matched to profiles regularly spaced on the outside surface of the upper stem 3, thus providing a mechanical restraint against movements between the parts when engaged. Clearance between the locking collet 26 and the upper end housing 21 enables the internal lip to ride freely over the companion upper stem profiles when the locking collet 26 is physically depressed into the housing. Thus the position of the upper stem 3 relative to the lower stem 2 is determined by the depth of the cistern, and the locking collet 26 then being depressed to lock the two stems together. The retaining collar 25 is provided with an internal rebate the function of which is to secure its location when installed on the upper end housing 21 of the mounting lower stem 2. The retaining collar 25 provides a limit to the expansion of the housing when subjected to the wedging action forces when the collet is pressed into its locking position.

The upper stem 3 is sized to telescope into the lower stem and has regular spaced external profiles to engage the locking collet. The lower end of the stem is fitted with a secondary O-ring to provide a pressure seal within the bore of the lower stem. The upper end of the upper stem is threaded 31 to accept the lower valve body 4, the junction of which is profiled to accept an O-ring 32 to form a pressure seal. The internal profile of the upper end is sized to accept and locate a filter screen 33 which is a fine mesh element through which the water passes to retain particulate material and debris entrained in the water supply.

The lower valve body 4 incorporates the main flow path through the valve and supports the discharge deflector skirt 41 and upper valve body 5 and also houses the vortex diffuser 35.

The flow path enters a choke restriction 44a in the lower valve body 4 which controls the rate of flow and then passes upwards to the valve seat 42 on which the main diaphragm valve 43 closes. When the diaphragm valve 43 is open the flow crosses the valve seat and turns downward into the annulus surrounding the seat, passes through the vortex diffuser 35 and is discharged through a circular array of eight holes 36 connected to a radial discharge slot. The lower valve body has a threaded upper portion 44 to accept the upper valve body and a radial channel 45 to locate and support the discharge deflector skirt 41 which is a ring shaped element with an internal rebate baffle companion to the lower valve body and a conical surface forming a downward deflecting annular slot when in companion with the lower valve body.

The upper valve body 5 is a cylindrical shaped element having an internal threaded base 51 companion with the lower valve body 4 and a tubular extension 52 which houses the actuator button plunger 53. The body also incorporates a sealing surface profile 54 on the inside for the controlling diaphragm valve 55. The tubular extension 52 is reinforced by eight stiffening webs 56 and is divided by eight vertical slots 57 forming four fingers which are free to articulate about their base. The inside surface of the fingers carry a profiled lip at the top to engage a groove 58 in the actuator button 53 such that the button, although free moving is retained in position. An aperture 59 that is stepping down in diameter and forming a sealing profile for the controlling diaphragm valve 55 connects the tubular extension 52 with the internal cavity of the upper valve body 5.

The actuator button incorporates a metal pin 60 the function of which is to bear on the controlling diaphragm valve and trigger the opening cycle of the main diaphragm valve 43. The limited movement of the plunger is controlled by the flange face of the mushroom head and the relative size of the retaining groove immediately below.

The function of the controlling diaphragm valve 55 is to depressurize the chamber above the main diaphragm valve 43 and to cause the diaphragm valve 43 to open. The controlling diaphragm 55 consists of a laminate of springy substrate and a resilient sealing pad 61 to seal on the sealing surface profile of valve seat 54. The diaphragm is a six spoke star shape of thin material supported at the tips of each spoke. In a preferred embodiment the diaphragm material is a thin piece of stainless steel.

A circular shaped spacer 62 with a bridging core 63 locates and supports a clearance pin 64. The bridging core has three regular spaced holes to allow fluid flow to pass through and provide material the centre to mount the pin 64. The spacer 62 serves several functions. It supports and locates the controlling diaphragm valve 55. It carries the clearance pin moulded integrally with the spacer and it clamps the diaphragm in position and preloads the diaphragm material to effect a pressure seal. It limits the stroke of the diaphragm insert movement. The ends of the spokes of the stainless steel diaphragm are located under the spacer and diaphragm insert 66.

The diaphragm insert 66 is a circular shaped element with a profile that supports the resilient diaphragm valve 43 and incorporates a guide to centre the diaphragm on the valve seat. The insert has an aperture 67 in the centre through which the clearance pin passes, the aperture being modestly larger than the pin allowing a controlled flow from beneath the diaphragm valve 43 to above the diaphragm valve 43 to thus pressurize the chamber above the diaphragm valve 43 when the diaphragm valve 43 is closed.

The vortex diffuser 35 has a profile which divides the annulus chamber of the lower-valve body, the flow being through four slots 68 at the divergence of the inner diameter. In addition the diffuser supports the main diaphragm 43 from over travel during the valve closure operation.

As noted above surrounding the valve body is a float canister 7 which has a conical end cap 7, two holes 71 and 72 in the end cap permitting air displacement. The float canister in conjunction with the float element 8 and canister extension 10 is to apply sufficient force, under the influence of gravity to stroke the actuator button 53 against the resistance caused by the controlling diaphragm valve spring and hydraulic pressure within the valve body.

Thus in operation when the water is discharged from the cistern, the float, canister extension and canister move downwardly until the conical end cap depresses the actuator button. The actuator pin then depresses the controlling diaphragm valve 55 moving it from its seat to bleed the water from the chamber above the diaphragm 43, water pressure beneath the diaphragm then lifts the diaphragm so that water passes over the seat, through the diffuser into the cistern.

When the water in the cistern reaches its fill level determined by the position of the float element on the canister the conical cap end moves away from the actuator button, and due to the spring pressure of the controlling diaphragm valve 55, the controlling diaphragm valve 55 will close. Water will then pass in a controlled manner through the aperture and pressurize the chamber above diaphragm 43 to set diaphragm on its seat thus closing the valve.

Referring now to FIGS. 9, 10 and 11 showing an alternate form of the invention where like parts retain the same numbering.

In the alternate form the float 8 is adjusted by screwing on the float canister to preselect the height of the water in the filled cistern. Also the actuator button has been modified to have the plunger fixed to the button.

Thus the cycle of operation of the cistern inlet valve is complete and the valve is now ready for the next operation.

Although one form of the invention has been described in some detail, the invention is not to be limited thereto but can include variations and modifications falling within the spirit and scope of the invention.

The invention claimed is:

1. A toilet cistern inlet valve, said inlet valve including an inlet stem connected to a water supply, a canister surrounding said inlet stem, a float canister freely supported on said canister, an annular float adjustably positioned on said float canister, an upper valve body, a resilient pilot diaphragm star valve, and a diaphragm filling valve within the upper valve body whereby during the emptying of the cistern the float canister lowers and contacts an actuator button to contact the resilient pilot diaphragm star valve to open the diaphragm filling valve to refill the toilet cistern, wherein said toilet resilient pilot diaphragm star has six radially extending arms, and an end of each radially extending arm is locatable and supportable by a surrounding spacer.

2. A toilet cistern inlet valve as defined in claim 1 wherein the material of the resilient pilot diaphragm star valve is thin stainless steel.

3. A toilet cistern inlet valve as defined in claim 1 wherein the centre of the resilient pilot diaphragm star valve incorporates a resilient sealing pad to seat on a valve seat on the upper valve body.

4. A toilet cistern inlet valve, said inlet valve including an inlet stem connected to a water supply, a canister surrounding said inlet stem, a float canister freely supported on said canister, an annular float adjustably positioned on said float canister, an upper valve body, a resilient pilot diaphragm star valve, and a diaphragm filling valve within the upper valve body whereby during the emptying of the cistern the float canister lowers and contacts an actuator button to contact the resilient pilot diaphragm star valve to open the diaphragm filling valve to refill the toilet cistern, wherein the float canister is attached to the canister by a screw thread whereby the float canister can be adjustably positioned on said canister.

5. A toilet cistern inlet valve as defined in claim 4 wherein the resilient pilot diaphragm star valve has a plurality of radially extending arms.

\* \* \* \* \*